(12) United States Patent
Stevenson et al.

(10) Patent No.: US 12,613,184 B2
(45) Date of Patent: Apr. 28, 2026

(54) SAMPLE HOLDER

(71) Applicant: Agilent Technologies, Inc., Santa Clara, CA (US)

(72) Inventors: Hugh Charles Stevenson, Hughesdale (AU); Philip Valmont Wilson, Mount Waverly (AU); Kellie Pearce, Mulgrave (AU)

(73) Assignee: Agilent Technologies, Inc., Santa Clara, CA (US)

( * ) Notice: Subject to any disclaimer, the term of this patent is extended or adjusted under 35 U.S.C. 154(b) by 105 days.

(21) Appl. No.: 18/292,877

(22) PCT Filed: Jul. 25, 2022

(86) PCT No.: PCT/IB2022/056826
§ 371 (c)(1),
(2) Date: Jan. 26, 2024

(87) PCT Pub. No.: WO2023/007341
PCT Pub. Date: Feb. 2, 2023

(65) Prior Publication Data
US 2024/0369475 A1 Nov. 7, 2024

(30) Foreign Application Priority Data
Jul. 26, 2021 (AU) ................................. 2021902278

(51) Int. Cl.
*G01N 21/31* (2006.01)
*G01N 21/03* (2006.01)
(Continued)

(52) U.S. Cl.
CPC ............. *G01N 21/31* (2013.01); *G01N 21/03* (2013.01); *G01N 21/0303* (2013.01);
(Continued)

(58) Field of Classification Search
CPC .... G01N 21/31; G01N 21/03; G01N 21/0303; G01N 21/05; G01N 21/33; G01N 21/35;
(Continued)

(56) References Cited

U.S. PATENT DOCUMENTS 6,320,196 B1 * 11/2001 Dorsel ............... G01N 21/6402
250/459.1
7,224,448 B2 * 5/2007 Ji .......................... B01L 3/0275
356/244
(Continued)

FOREIGN PATENT DOCUMENTS

CN 106769942 A 5/2017
EP 1223428 A1 7/2002
(Continued)

OTHER PUBLICATIONS

English machine translation of JPH07333138A (Year: 1995).*
(Continued)

*Primary Examiner* — Dominic J Bologna
(74) *Attorney, Agent, or Firm* — Foley & Lardner LLP

(57) ABSTRACT

The present invention is directed to a sample holder for use in molecular absorption spectroscopy. The sample holder comprises a first surface having a first predetermined geometry, and a second surface having a second predetermined geometry. The first surface is opposite the second surface. The sample holder is configured to hold a measurement sample between the first surface and the second surface such that a distance between the first surface and the second surface defines an optical pathlength of the sample holder. The predetermined geometries of the first surface and the second surface provides a continuously variable cross-section across the sample holder so as to provide a continuous range of optical pathlengths.

18 Claims, 11 Drawing Sheets

(51) Int. Cl.

| | |
|---|---|
| *G01N 21/05* | (2006.01) |
| *G01N 21/33* | (2006.01) |
| *G01N 21/35* | (2014.01) |
| *G01N 21/3577* | (2014.01) |
| *G01N 21/359* | (2014.01) |

(52) U.S. Cl.
CPC .............. *G01N 21/05* (2013.01); *G01N 21/33* (2013.01); *G01N 2021/0389* (2013.01); *G01N 21/35* (2013.01); *G01N 21/3577* (2013.01); *G01N 21/359* (2013.01); *G01N 2201/0231* (2013.01); *G01N 2201/0668* (2013.01); *G01N 2201/121* (2013.01); *G01N 2201/1211* (2013.01); *G01N 2201/127* (2013.01)

(58) Field of Classification Search
CPC .............. G01N 21/3577; G01N 21/359; G01N 2021/0389; G01N 2201/0231; G01N 2201/0668; G01N 2201/121; G01N 2201/1211; G01N 2201/127
See application file for complete search history.

(56) References Cited

U.S. PATENT DOCUMENTS

| | | | | |
|---|---|---|---|---|
| 7,777,887 | B2 * | 8/2010 | Pralle ................... | G01N 21/031 |
| | | | | 356/440 |
| 8,570,521 | B2 * | 10/2013 | Chumachenko ... | G01N 21/0303 |
| | | | | 356/440 |

| | | | | |
|---|---|---|---|---|
| 2008/0187011 | A1 * | 8/2008 | Kiesel ....................... | G01J 3/26 |
| | | | | 372/19 |
| 2011/0149280 | A1 * | 6/2011 | Juhl ................... | G01N 21/0303 |
| | | | | 356/244 |
| 2012/0127470 | A1 * | 5/2012 | Chumachenko ... | G01N 21/0303 |
| | | | | 356/440 |
| 2020/0041405 | A1 * | 2/2020 | Stevenson ................. | G01J 3/10 |
| 2022/0146311 | A1 * | 5/2022 | Garini ....................... | G01J 3/12 |
| 2024/0230517 | A1 * | 7/2024 | Rodríguez García .... | B22C 7/02 |

FOREIGN PATENT DOCUMENTS

| | | | |
|---|---|---|---|
| EP | 1953533 A1 | | 8/2008 |
| JP | H07333138 A | * | 12/1995 |
| JP | 2010-175342 A | | 8/2010 |

OTHER PUBLICATIONS

Engllish machine translation of JP H07333138 (Year: 1994).*

Papaspyridakou, Panagiota et al., "Comparative Study of Sample Carriers for the Identification of Volatile Compounds in Biological Fluids Using Raman Spectroscopy," Molecules, vol. 27, No. 3279, 2022, 22 pages.

PCT, "Notification of Transmittal of the International Search Report & Written Opinion mailed on Sep. 16, 2022," Application No. PCT/IB2022/056826, 8 pages.

Ruhlandt, Daja et al., "Absolute Quantum Yield Measurements of Fluorescent Proteins Using a Plasmonic Nanocavity," Communications Biology, vol. 3, No. 627, 2020, 7 pages.

EPO, "Extended European Search Report mailed on Mar. 28, 2025", Application No. 22848778.1, 7 pages.

\* cited by examiner

900

Apply spatial filtering to original
detector signal                              902

Determine refractive index based
on spacing of high frequency
features                                     904

Determine transmission values based
on estimated refractive index and filtered
low spatial frequencies                      906

Optimisation                                 908

SAMPLE HOLDER

This application is a US national stage entry of PCT/IB2022/056826, filed Jul. 25, 2022, which claims the benefit of Australian Patent Application No. 2021902278, filed on Jul. 26, 2021, the contents of which are incorporated herein by reference in their entirety.

TECHNICAL FIELD

The present invention relates to an improved sample holder. In particular, embodiments of the invention relate to a sample holder for use in molecular absorption spectroscopy, a spectrophotometer including a sample holder, and a method of using a spectrophotometer to analyse a measurement sample disposed in a sample holder.

BACKGROUND OF INVENTION

In the field of absorption spectroscopy, the optical absorption spectra of liquid substances are measured. The absorption spectrum is the measurement of light attenuation as a function of light wavelength. In a simple spectrophotometer, a measurement sample is placed into a transparent container, typically known as a cuvette, sample cell or sample holder. Light of a known wavelength and intensity is incident on one side of the sample holder, and a detector measures the intensity of light exiting the sample holder. The shape of the sample holder defines the distance that the light travels through the sample. This distance is referred to as the optical pathlength of the sample holder. Generally, light transmitted through the measurement sample follows a known relationship such that properties of the measurement sample can be determined based on the absorption spectrum. In other words, if the absorption spectrum for a given substance is known, its presence and concentration in a measurement sample may be determined.

Often the compound of interest in a solution is highly concentrated. For example, certain biological samples, such as proteins, DNA or RNA are often present in concentrations that fall outside the linear range of the spectrophotometer when absorbance is measured. Therefore, dilution of the sample is often required to measure an absorbance value that falls within the linear range of the instrument. Traditionally, the concentrated samples are diluted prior to analysis so that a suitable absorbance (often in the range of 0.2 to 1.2 absorbance units) is achieved with an optical pathlength of roughly between 1 and 10 mm. In some instances, multiple dilutions of the sample are required, which creates an opportunity to introduce human error and inaccuracies into the measurements, as well as downstream application. In addition, the need to carry out additional dilution steps causes the measurements to be time consuming and labour-intensive. Accordingly, it would be desirable to take existing samples with no knowledge of the possible concentration and measure the absorption of these samples without dilution.

Traditionally, the optical pathlength associated with a sample holder in a spectrophotometer is fixed. In recent times, spectrometers and sample handling technologies have been developed to allow sample measurements to be made at more than one optical pathlength so as to achieve an absorbance value within a measurable range.

For example, the CTech™ SoloVPE® system allows measurement of sample absorbance at variable pathlengths by providing a fibre optic probe which is movable in the vertical direction within a sample holder. The probe provides light to measure the sample within the sample holder. A detector is disposed to receive the light emanating from the probe transmitted through the sample. Movement of the probe within the sample in the sample holder effectively provides the variable pathlength for analysis.

However, slowly moving a probe within a sample relative to the detector to achieve an accurate and viable measurement can be a time-consuming process. In addition, the CTech™ SoloVPE® system moves the probe to take measurements for each of the pathlengths one at a time and calculates sample properties based on a regression analysis. Oftentimes, it can be difficult to achieve the optimum signal to noise ratio for the measurements.

The movement of the probe can also cause instability in the intensity of the light radiation emanating from the probe which can affect the accuracy of measurements for low absorbance samples. In addition, the probe is associated with a drive assembly including a motor for affecting the linear movement of the probe. The ability of the system to provide accurate and repeatable measurements relies on the accuracy and repeatability in the operation of the drive assembly. Inevitably, movement of the mechanical components within the drive assembly will create inaccuracies, for example due to hysteresis, thermal expansion, friction, movement due to clearance and various motor related errors. The drive assembly will also be subject to wear and tear. As such, frequent inspection and maintenance would be required to maintain an acceptable level of accuracy. Moreover, for low concentration samples, a relatively long pathlength (e.g. up to 15 mm) must be used, requiring a relatively large sample volume. This can be disadvantageous if the sample is in very short supply and/or is very expensive.

In another example, NanoDrop™ spectrophotometers provide a sample holder for holding a measurement sample between two opposing surfaces. The two opposing surfaces can move relative to one another to effectively provide changes in the optical pathlength. However, relying on moving parts to provide a change in pathlength has inherent limitations in the accuracy and repeatability of measurements. In a further example, Unchained Labs Lunatic spectrophotometers provide a sample cell having two path lengths for carrying the sample. The sample cell provides discrete changes in the thickness of the cell in the measurement direction to thereby provide two different discrete pathlengths. In both examples, only a limited number of discrete pathlengths are provided. Furthermore, it can be difficult to achieve acceptable accuracy in certain measurements, particularly at the short pathlengths (e.g. often in the region of 50-100 um). For a pathlength of 50 $\mu$m, an error of less than 500 nm is required to achieve an accuracy of 1%, which can be very difficult to achieve.

Embodiments of the invention may provide a sample holder, a spectrophotometer, and a method of operation which overcomes or ameliorates one or more of the disadvantages or problems described above, or which at least provides the consumer with a useful choice.

A reference herein to a patent document or any other matter identified as prior art, is not to be taken as an admission that the document or other matter was known or that the information it contains was part of the common general knowledge as at the priority date of any of the claims.

SUMMARY OF INVENTION

According to one aspect of the invention, there is provided a sample holder for use in molecular absorption spectroscopy, the sample holder comprising a first surface having a first predetermined geometry, and a second surface having a second predetermined geometry, the first surface being opposite the second surface, the sample holder being configured to hold a measurement sample between the first surface and the second surface such that a distance between the first surface and the second surface defines an optical pathlength of the sample holder, wherein the predetermined geometries of the first surface and the second surface provide a continuously variable cross-section across the sample holder so as to provide a continuous range of optical pathlengths.

The sample holder may be configured to hold any suitable measurement sample, having any suitable consistency. For example, the measurement sample may have any viscosity. Typically, the sample is a liquid sample.

The first predetermined geometry may be the same as the second predetermined geometry. Alternatively, the first predetermined geometry may be different to the second predetermined geometry.

The predefined geometries of the first and second surfaces provides the continuously variable cross-section across the sample holder, which advantageously provides a continuous range of optical pathlengths without the need for moving parts in contact with the measurement sample, thereby avoiding inaccuracies associated with such moving parts.

The continuously variable cross-section may include a first measurement zone in which a minimum distance between the first surface and the second surface defines a minimum optical pathlength, and a second measurement zone in which a maximum distance between the first surface and the second surface defines a maximum optical pathlength. The continuously variable cross-section may provide a continuous range of optical pathlengths between the first measurement zone and the second measurement zone.

In some embodiments, the first surface may contact the second surface to provide a minimum optical pathlength of zero in the first measurement zone. In other embodiments, the first surface may not contact the second surface and the minimum optical pathlength may be close to zero. The sample holder can therefore advantageously provide the continuous range of optical pathlengths from zero to any desirable maximum pathlength. In practice, arranging the first and second surfaces of the sample holder to have a contact point or near contact point as described herein provides accurate positioning of the surfaces relative to one another and precise control of the non-zero pathlengths.

The first and second surfaces may have any suitable geometries to provide the desired continuously variable cross-section of the sample holder. For example, one or both of the first and second surfaces may be curved. The curvature of the one or more surfaces may follow a regular or irregular predetermined geometry. Typically, the first surface may be curved. The second surface may be flat or substantially flat.

In some embodiments, one or both of the first predetermined geometry and second predetermined geometry is defined by any one of the following a sphere, a parabolic cylinder, a circular paraboloid, an elliptic paraboloid, and an arbitrary smooth aspheric surface.

In a sample holder according to embodiments of the present invention, the continuous range of optical pathlengths may be capable of providing pathlength variations in the order of about 1 μm to 3 mm. This advantageously allows high resolution and accurate sample measurements to be carried out at high speed.

Accordingly, the sample holder may provide a continuous range of optical pathlengths varying spatially from 0 to any maximum pathlength with a pathlength variation in the order of about 1 μm, without any moving parts in contact with the measurement sample. The sample holder is therefore capable of providing measurable pathlengths in at least one region of the sample holder for a sample of any unknown concentration, or any concentration within a wide range of acceptable concentrations.

Moreover, the need for an operator to manually select a range of measurable pathlengths is circumvented as the sample holder allows measurement of all pathlengths within the continuous range of pathlengths, thereby increasing operating efficiency and reducing human error.

In practice, the sample holder may include a plano-convex lens having a curved side providing the first surface. The plano-convex lens may be moveable between an open position in which the first surface is separated from the second surface, and a closed position in which the first surface contacts the second surface and is disposed opposite the second surface.

Typically, in the closed position, the position of the first surface is fixed relative to the second surface, and the variable distance between the first and second surfaces is created by their respective predetermined geometries.

The sample holder may be made from any suitable material, or a combination of different suitable materials. In some embodiments, the sample holder may be disposable. In these embodiments, the sample holder may be made from a plastic material. In other embodiments, the sample holder may be reusable, and made from a glass material.

In some embodiments, the sample holder may be a flow cell having an inlet and a vent to allow injection of the measurement sample into the sample holder via the inlet. In these embodiments, the first surface and the second surface of the sample holder may be flexible to allow cleaning of the first and second surfaces, for example via flushing of the sample holder.

Advantageously, the sample holder according to embodiments of the present invention allows fast, accurate quantitation of concentration (e.g. typically protein concentration) over a wide dynamic range (e.g. over 4 orders of magnitude) using only a very low sample volume (e.g. a few microlitres), without requiring moving parts in contact with the sample.

As the sample holder of the present invention is capable of providing pathlength variations in the order of 1 μm with a range of continuous pathlengths starting from zero or near zero, the sample holder also allows low volume samples to be accurately measured.

According to another aspect of the invention, there is provided a spectrophotometer having a sample holder as described herein.

The spectrophotometer may have any suitable configuration and the sample holder may be disposed in any suitable location within the spectrophotometer.

In some embodiments, the spectrophotometer may operate in the ultraviolet-visible (UV-VIS) range. In some embodiments, the near-infrared (NIR) or infrared (IR) range.

The spectrophotometer may further include a detector for detecting absorbance of the measurement sample at each pathlength of the continuous range of optical pathlengths. Any suitable detector may be used. In some embodiments, the detector may be any one of the following detectors:

a single point detector, a one-dimensional array detector, or a two-dimensional array detector.

The spectrophotometer may further include a light source. Any suitable light source may be used. In some embodiments, the light source may include any one of the following:

a broadband light source, an LED, and a laser.

In some embodiments, the light source provides light simultaneously across the entire measurement sample. In these embodiments, the light source may be stationary. In spectrophotometers having a stationary source, no moving parts are required throughout the entire instrument. This further provides advantages associated with even higher measurement speeds whilst maintaining high accuracy in the measurements. Moreover, maintenance of moving parts is not required, thereby reducing downstream costs.

The spectrophotometer may have any suitable configuration and the sample holder may be disposed in any suitable location relative to the light source and the detector within the spectrophotometer.

The spectrophotometer may further include a mask positioned between the light source and the sample holder such that light passing through the mask projects a predetermined shadow pattern for detection by the detector, the spectrophotometer being configured to calibrate effects caused by refraction at one or both of the first and second surfaces of the sample holder based on the detected shadow pattern.

In some embodiments, the spectrophotometer may further include one or more optical elements. The one or more optical elements may be positioned in any suitable location relative to the sample holder, light source and detector. The one or more optical elements may be any one or more of light dispersing elements or light focusing elements, and the like. For example, the optical elements may include one or more mirrors, lenses, diffraction gratings, prisms, crystals, fibers, wave guides, or any combination thereof.

In some embodiments, the light source may provide a light beam which is moveable relative to the measurement sample to scan the measurement sample such that a transmission value is detectable for each pathlength in the range of pathlengths sequentially. In one embodiment, the light beam moves from one end of the sample holder to an opposite end of the sample holder. In other embodiments, the light beam may move in a circular motion.

A spectrophotometer may further include a temperature controller for controlling the temperature of the measurement sample.

According to a further aspect of the invention, there is provided a computer implemented method of using a spectrophotometer to analyse a measurement sample disposed in a sample holder as described herein, the spectrophotometer including a light source for emitting light through the measurement sample, and a detector for detecting light intensity transmitted through the measurement sample. The method includes the steps of obtaining a detected transmission value corresponding to each optical pathlength of the sample holder, the detected transmission value being based on one or more light intensity measurements from the detector, calculating an estimated transmission value corresponding to each optical pathlength of the sample holder, determining an attenuation coefficient of the measurement sample that minimizes an error between the detected transmission values and the estimated transmission values.

The step of calculating an estimated transmission value may include the steps of calculating an estimated attenuation coefficient of the measurement sample based on a corresponding detected transmission value, and calculating an estimated transmission value based on the estimated attenuation coefficient.

The step of determining an attenuation coefficient of the measurement sample may be an iterative process.

The method may further include the step of determining a value for each optical pathlength as a function of a refractive index of the measurement sample.

According to yet another aspect of the invention, there is provided a computer implemented method of using a spectrophotometer to analyse a measurement sample disposed in a sample holder as described herein. The spectrophotometer includes a light source for emitting light through the measurement sample, a detector for detecting light intensity transmitted through the measurement sample, and a higher spatial frequency modulation pattern associated with the light source such that high spatial frequency features can be detected by the detector. The method may include the steps of providing a predetermined modulation model for predicting a light intensity value of the detector corresponding to each refractive index in a range of predefined refractive indices and corresponding to each optical pathlength, obtaining a detected transmission value corresponding to each optical pathlength, the detected transmission value being based on one or more light intensity measurements from the detector, calculating an estimated transmission value for the measurement sample corresponding to each optical pathlength and each refractive index based on the predetermined modulation model, determining an attenuation coefficient of the measurement sample that minimizes an error between the detected transmission values and the estimated transmission values.

According to another aspect of the invention, there is provided a computer implemented method of using a spectrophotometer to analyse a measurement sample disposed in a sample holder as described herein. The spectrophotometer includes a light source for emitting light through the measurement sample, a detector for detecting illumination signals representing light intensity transmitted through the measurement sample, and a higher spatial frequency modulation pattern associated with the light source such that high spatial frequency features can be detected in the illumination signals of the detector. The method may include the steps of filtering the illumination signals to obtain first filtered illumination data in which the high spatial frequency features are extracted from the illumination signals, and second filtered illumination data in which the high spatial frequency features are removed from the illumination signals, calculating a value for refractive index based on the first filtered illumination data, obtaining a detected transmission value corresponding to each optical pathlength, the detected transmission value being based on the second filtered illumination data, calculating an estimated transmission value for the measurement sample corresponding to each optical pathlength based on the calculated refractive index, determining an attenuation coefficient of the measurement sample that minimizes an error between the detected transmission values and the estimated transmission values.

According to yet another aspect of the invention, there is provided one or more tangible non-transitory computer-readable media having computer-executable instructions for performing a computer-implemented method as described herein.

According to a further aspect of the invention, there is provided a method of manufacturing a sample holder described herein. The method may include the steps of forming a first portion of the sample holder to provide the first surface, and forming a second portion of the sample holder to provide the second surface, attaching the first portion to the second portion such that the first portion is movable relative to the second portion between an open position to allow placement or removal of the measured sample, and a closed position in which the first surface is in a fixed position relative to the second surface to provide the continuously variable cross-section across the sample holder.

According to a further aspect of the invention, there is provided a method of manufacturing a sample holder as described herein, the method comprising the steps of forming a first portion of the sample holder to provide the first surface, and forming a second portion of the sample holder to provide the second surface, attaching the first portion to the second portion such that the first surface is fixed relative to the second surface to provide the continuously variable cross-section across the sample holder, creating an opening to allow injection of the measurement sample into a cavity between the first portion and the second portion.

In order that the invention may be more readily understood and put into practice, one or more preferred embodiments thereof will now be described, by way of example only, with reference to the accompanying drawings.

DETAILED DESCRIPTION

Figure 1A:
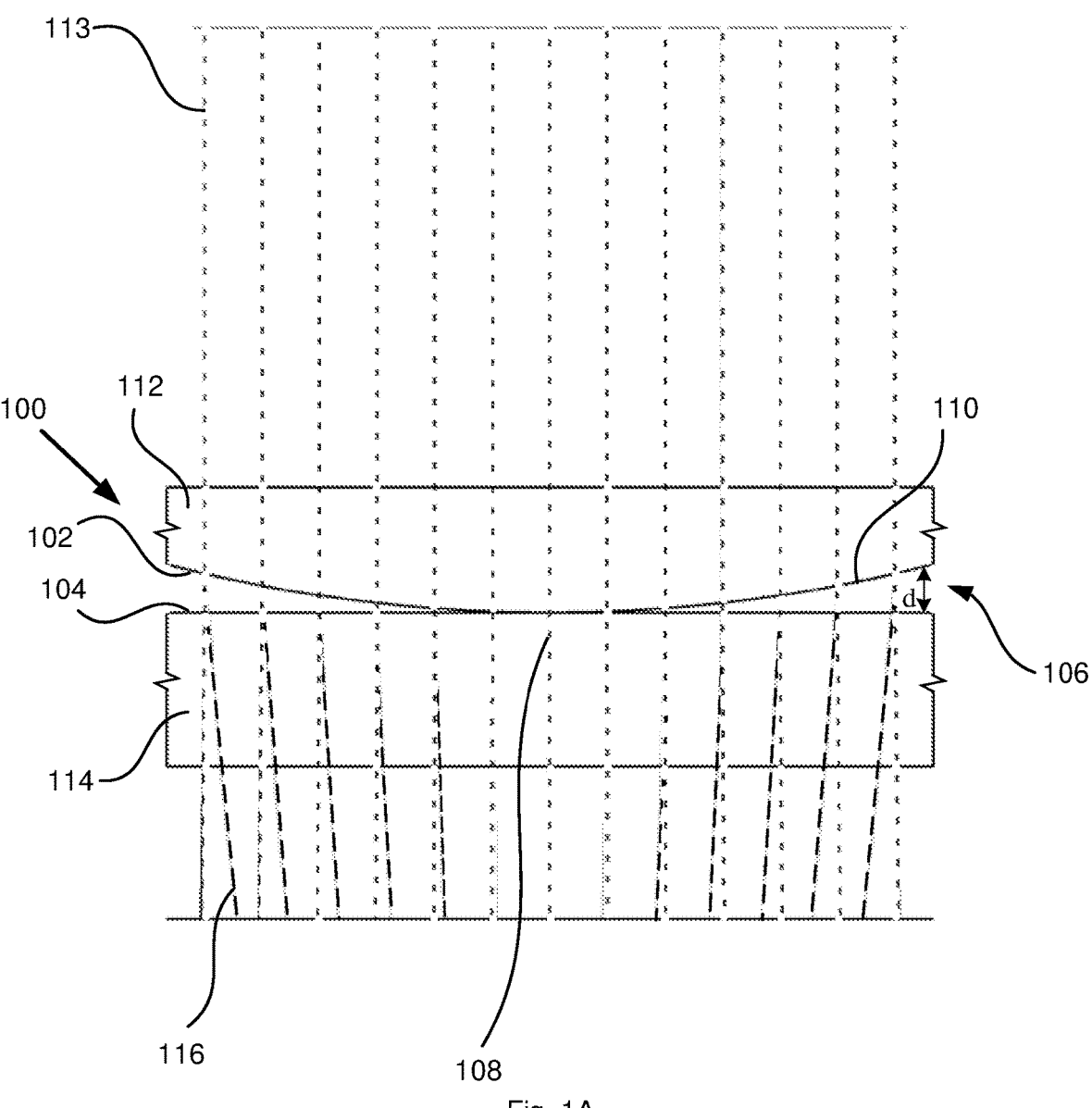
FIG. 1A is a schematic diagram illustrating a partial cross-section of a sample holder according to an embodiment of the invention.

A partial cross-sectional view of a sample holder 100 for use in molecular absorption spectroscopy according to an embodiment of the invention is illustrated in FIG. 1A. The sample holder 100 has a first portion 112 providing a first curved surface 102 having a first predetermined geometry, and a second portion 114 providing a second substantially flat surface 104 having a second predetermined geometry. Whilst not specifically shown in the drawings, the first predetermined geometry of the first curved surface 102 may be any one of a sphere, a parabolic cylinder, a circular paraboloid, and an elliptic paraboloid.

One advantage of the symmetrical nature of these geometries is that any phenomena such as air bubbles in the sample 201 or insufficient filling of the cavity between the first and second surfaces 102, 104 can be easily detected so that an appropriate action can be taken to rectify any errors. Moreover, in embodiments where the first curved surface 102 is spherical, any variation in angle between the first and second portions 102, 104 of the sample holder 100 would not affect operation due to the symmetrical nature of the spherical geometry.

The sample holder 100 is configured to hold a measurement sample 201 (also see FIG. 2) between the first surface 102 and the second surface 104 such that a distance d (FIG. 1A) between the first surface 102 and the second surface 104 defines a plurality of different optical pathlengths 106 of the sample holder 100. In particular, the predetermined geometries of the first surface 102 and the second surface 104 provides a continuously variable cross-section across the sample holder 100 so as to provide a continuous range of different optical pathlengths 106.

As shown in FIG. 1A, the continuously variable cross-section of the sample holder 100 includes a first measurement zone 108 in which a minimum distance between the first surface 102 and the second surface 104 defines a minimum optical pathlength 106. The minimum optical pathlength 106 can be zero, in which case the first surface 102 makes contact with the second surface 104 in the first measurement zone 108. Alternatively, the minimum optical pathlength 106 is a small value near zero, in which case the first surface 102 does not make contact with the second surface 104 in the first measurement zone 108. The continuously variable cross-section of the sample holder 100 further includes a second measurement zone 110 in which a maximum distance between the first surface and the second surface defines a maximum optical pathlength 106. A continuous range of different optical pathlengths 106 ranging from the minimum pathlength 106 in the first measurement zone 108 to the maximum pathlength 106 in the second measurement zone 110 is provided.

As the sample holder 100 is symmetrical about a centre plane (not shown) intersecting with the first measurement zone 108, a first set of continuous range of optical pathlengths 106 is provided on one side of the of the centre plane and a second set of continuous range of optical pathlengths 106 matching the first set is provided on the opposite side of the centre plane. In embodiments where the first curved surface 102 has a regular geometry (such as a sphere, a parabolic cylinder, a circular paraboloid, or an elliptic paraboloid), an infinite set of matching optical pathlength continuous ranges may be provided. Typically, the continuous range of optical pathlengths within each set can provide pathlength variations in the order of about 1 μm to 3 mm. The ability to provide small pathlength variations in the continuous range of pathlengths allows a suitable measurement range to be determined for a wide range of different sample concentrations, and high accuracy measurements to be carried out within the suitable measurement range.

Whilst not shown in FIG. 1A, it is understood that the first portion 112 may be moveably attached or fixedly attached to the second portion 114. Alternatively, the first portion 112 may be separate to the second portion 114. The sample holder 100 can be made from any suitable material, including one or more plastic materials and/or glass materials.

Advantageously, it is possible to produce a continuous range of optical pathlengths 106 with very high accuracy, as the accuracy of the pathlengths are only dependent on the accuracy of the geometries of the first and second surfaces 102, 104. Using today's optical manufacturing technology, it is possible to achieve high accuracy in the predetermined surface geometries.

In use, light 113 from a light source 208 (see FIG. 2) is incident on one side of the sample holder 100. The light beams 113 transmit through the sample holder 100 and measurement sample 201, and onto the detector 202. The transmitted light detected by the detector 202 at different wavelengths can be used to construct the absorption spectrum of the measurement sample 201 as described in further detail below with reference to FIGS. 2 to 4.

Typically, near the centre of the sample holder 100 (or first measurement zone) 108, where the pathlength is near 0, the light beam 108 is barely attenuated at all. At the edges (or the second measurement zone 110), where the pathlength is maximum, the light beam 108 is attenuated more strongly (see FIG. 6B).

Figure 2:
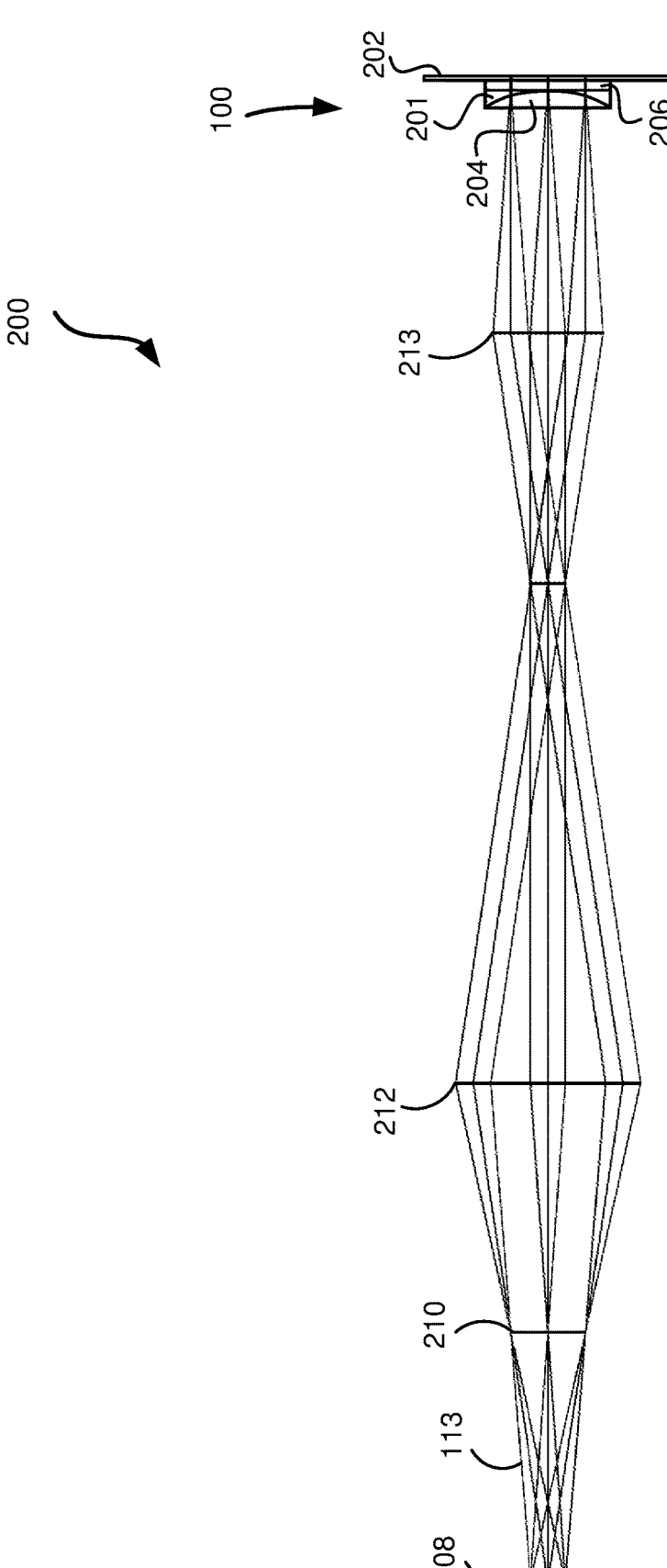
FIG. 2 is a schematic diagram of a spectrophotometer according to one embodiment of the invention.

In practice, light 110 transmitted through the sample holder 100 and measurement sample 201 is subject to refraction 116. In some embodiments, it is necessary to take into consideration the effect of the refraction of light 110 by determining a value for the refractive index when analysing the sample 201. In these embodiments, the refractive index of the sample 201 affects the intensity pattern or absorption spectra detected by the detector 202. As illustrated in FIG. 2, a mask 210 can be provided to project a known shadow pattern onto the surface of the detector 202. Changes in this shadow pattern can be detected to calculate the refractive index. This can be used to either correct the absorption spectra or as an additional analytical output, or both. Calculations relating to the refractive index will be discussed in further detail below with reference to FIGS. 9 to 11B.

Figure 1B:
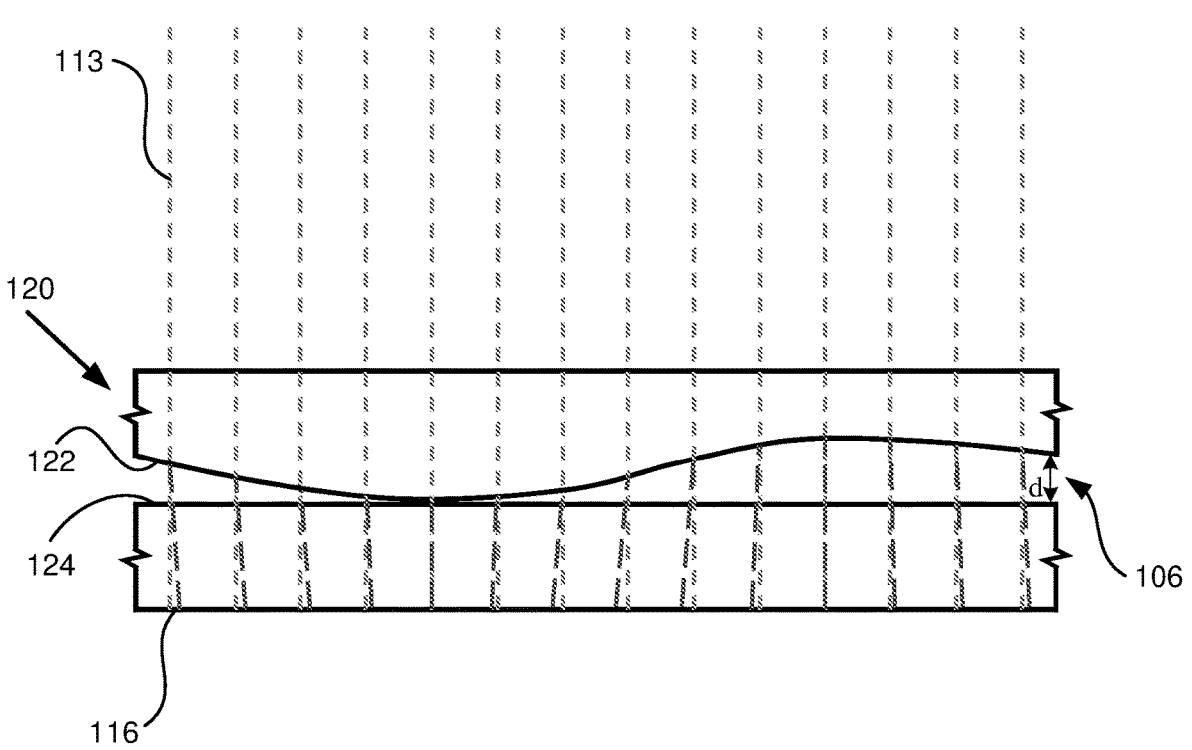
FIG. 1B is a schematic diagram illustrating a partial cross-section of a sample holder according to another embodiment of the invention.

FIG. 1B illustrates a partial cross-sectional view of a sample holder 120 according to another embodiment of the invention. The sample holder 120 has a curved first surface 122 and a substantially flat second surface 124. The first surface 122 is an arbitrary smooth aspheric surface. Like numerals in FIG. 1B refer to like features previously described with reference to FIG. 1A. The predetermined geometries of the first surface 122 and the second surface 124 provides a continuously variable cross-section across the sample holder 120 so as to provide a continuous range of different optical pathlengths 106.

FIG. 2 illustrates a spectrophotometer 200 according to one embodiment of the invention. Generally, the spectrophotometer is configured to operate in the ultraviolet-visible (UV-Vis) range. The spectrophotometer 200 includes a sample holder 100 in accordance with the partial cross-section shown in FIG. 1A. In the spectrophotometer 200, the sample holder 100 includes a plano-convex lens 204 providing the first portion 112 and the first curved surface at an underside thereof. The sample holder 100 also includes a substantially flat window 206 providing the second portion and second substantially flat surface on a topside of the window 206. The plano-convex lens 204 contacts or nearly contacts the window 206 at a centre portion of the lens 204. The measurement sample 201 is disposed between the lens 204 and window 206.

In the spectrophotometer 200, light 113 from a source 208 is projected onto a mask 210 for creating a higher spatial frequency modulation pattern in the source illumination. The mask 210 creates a shadow pattern on the detector 202 to facilitate calculations for a refractive index. Changes in the shadow pattern are detectable and the refractive index can be estimated based on the measured changes of the shadow pattern. The absorptivity of the sample is the imaginary part of the refractive index. The measured real part of the refractive index may be used to correct the absorptivity of the sample as discussed in further detail below with reference to FIGS. 9 to 11B.

In the particular configuration shown in FIG. 2, the focusing elements 212 and 213 image the mask 210 onto the detector 202, passing through the sample holder 100 and the measurement sample 201. The detector 202 detects transmission of light 113 through the sample holder 100 and measurement sample 201. The transmission detected by the detector 202 is processed, for example by a processor, to determine the absorption spectra and other properties of the measurement sample 201. Whilst not shown in FIG. 2, it is understood that the processor may be any suitable processor, either built-in to the spectrophotometer 200 hardware, or provided separately to the spectrophotometer 200.

Moreover, in other specific embodiments, different configurations are possible for the spectrometer 200 without departing from the scope of the present invention. For example, in some embodiments, a wavelength selective element may be provided in the light path before the sample holder 100. In some embodiments, a monochromator may be provided in the light path upstream of the sample 201. In some embodiments, a polychromator may be provided in the light path downstream of sample 201.

In addition, the location of the lens 204 relative to the detector 202 is not critical as the centre of the symmetrical pattern in the absorption spectra can be easily determined as a reference. Indeed, the sample holder 100 may be disposed in any suitable location relative to the light source 208 and the detector 202 within the spectrophotometer 200.

Typically, the detector 202 is a two-dimensional (2D) array detector. In practice, the detector 202 may include a charge coupled device (CCD) array detector, a complementary metal oxide semiconductor (CMOS) sensor array detector, or a microbolometer array detector. In some embodiments, a one-dimensional (1D) array detector may be used.

In some embodiments, the light source 208 may provide white light, and wavelength selectivity can be provided by way of a polychromator after the measurement sample 201. This configuration may be used to create an output of transmission vs wavelength and pathlength, for example, on a 2D array detector where wavelengths are dispersed in one dimension and pathlength variations are spread across the other dimension.

In some embodiments, LEDs (260, 280 320 nm) could be used for the light source 208. In these embodiments, additional wavelength selectivity would not be required to carry out the sample analysis.

In some embodiments, a pre-dispersion element may be provided in the light path before the measurement sample 201. In some embodiments, a post-dispersion element may be provided in the light path after sample 201.

Typically, for high absorbance samples 201, the outer part of the absorption image typically has very little light and poor signal to noise ratio. In some embodiments, an optimized weighting function can be applied to the calculation so that a part of the absorption spectra image where there is sufficient light to give good signal to noise ratio is included and the poor region is excluded.

Moreover, the detector 202 does not have to operate at very low light levels because for any sample 201 in the sample holder 100, the associated absorption spectra image will always include a region with relatively high light levels.

In the spectrophotometer 200 shown in FIG. 2, the light source 208 is stationary and provides light simultaneously across the entire measurement sample 201. For spectrophotometer 200, no moving parts are required throughout the entire instrument.

Figure 3:
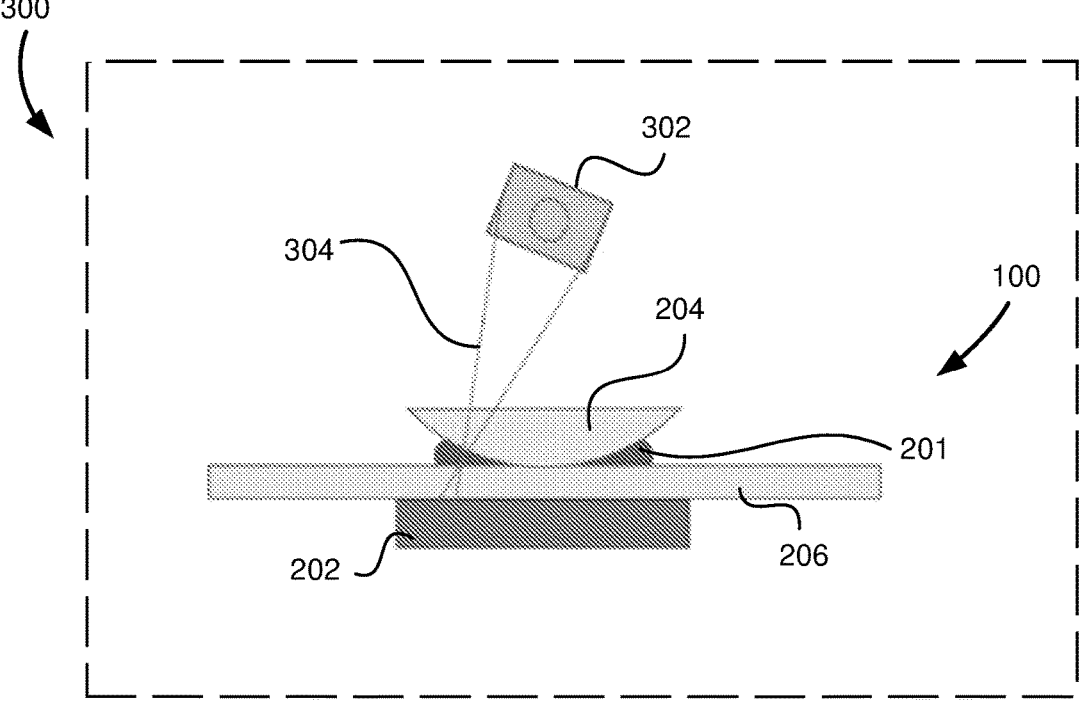
FIG. 3 is a schematic diagram of a spectrophotometer according to another embodiment of the invention.

In an alternative embodiment as shown in FIG. 3, the light source 302 of spectrophotometer 300 provides a light beam 304 which is moveable relative to the measurement sample 201 to scan the measurement sample 201 from one end of the sample holder 100 to an opposite end of the sample holder 100. According to this configuration, the detector 202 detects a transmission value for each pathlength in the range of pathlengths sequentially as the light source 302 moves from one end of the sample holder 100 to the other. The spectrophotometer 300 shown in FIG. 3 can be used to operate in the near-infrared (NIR) or infrared (IR) range. By using a moveable source 302 as illustrated in FIG. 3, the effects of refractive index can be reduced by setting up the light beam 304 to be substantially perpendicular to the surface 122 and the sample 201.

Generally, infrared measurements present challenges typically not associated with the UV-VIS spectral range. Of particular importance is the high attenuation of some wavelength ranges by water. For example, the protein amide I band around 1650 cm$^{-1}$ is significantly overlapped by the water absorption band centred at 1653 cm$^{-1}$. This means that, to be able to detect small concentrations of protein, the spectrophotometer 300 must be able to resolve very small changes in absorbance due to the analyte in the presence of huge absorbance due to the solvent (water). The repeatability of the geometry of the first and second surfaces 102, 104 in the sample holder 100 allows accurate subtraction of a reference measurement, which is not dependent on the spacing between the surfaces 102, 104.

In another embodiment, the light source 302 is stationary and the sample holder 100 is moveable to allow the light beam 304 to move from one end of the sample holder 100 to the other, in order to achieve measurements with varying pathlengths with respect to time. In the above embodiments, a single point detector can be used to detect light transmission through the sample 201. In one example, the single point detector may be a mercury cadmium telluride (MCT) detector. In some embodiments, the light source 302 can be radially aligned with the single point detector.

In practice, the movement of the sample holder 100 can be relatively small, for example, in the order of several millimetres. In some embodiments, the movement of the sample holder 100 can be achieved using a flexure mechanism. In some embodiments, the detector 202 may be moveable relative to the sample 201.

In a further alternative embodiment, to operate in the IR or NIR range, the spectrophotometer may be configured to allow comparison between two samples. In particular, the absorption of a solvent only sample can be compared with a sample comprising solvent and analyte. The spectrometer may include two identical sample holders to hold the two samples, or a single sample holder having two cavities for holding the two samples. The comparison analysis may be carried out simultaneously using a double-beam configuration in which light beams are simultaneously projected onto both samples. Alternatively, a single sample holder may be provided to hold the two samples sequentially.

In these embodiments, the spectrophotometer may include a temperature controller for controlling the temperature of the measurement samples. In particular, the temperature controller can be used to ensure that the temperature of the samples is substantially constant during measurements. Changes in temperature can often cause changes in the absorbance of the solvent. Accordingly, errors associated with temperature changes can be minimised by using a temperature controller to maintain a substantially constant temperature in the measurement samples. In particular, the temperature controller may be provided to maintain substantially constant temperature spatially across the samples if measurement of the two comparison samples are carried out simultaneously. Alternatively, the temperature controller may be provided to maintain substantially constant temperature temporally for the samples if measurement of the two comparison samples are carried out sequentially.

In practice, a quantum cascade laser (QCL) can be used as the light source 302. The QCL is a powerful source of monochromatic IR radiation. It is a relatively small source and can be efficiently coupled to an optical system. The relatively high power enables results to be achieved relatively efficiently. In addition, the requirements for detectors would be less critical, thereby providing potential cost and complexity savings. For instance, room temperature or thermoelectrically cooled detectors may be used instead of cryogenic temperature detectors. In some applications, only a few wavelengths are of interest. For such applications, the use of a QCL source would be especially suitable.

In some embodiments, the detector 202 may be a microbolometer array detector. In other embodiments, the detector 202 may be a 1D or 2D Mercury Cadmium Telluride detector.

Figure 4:
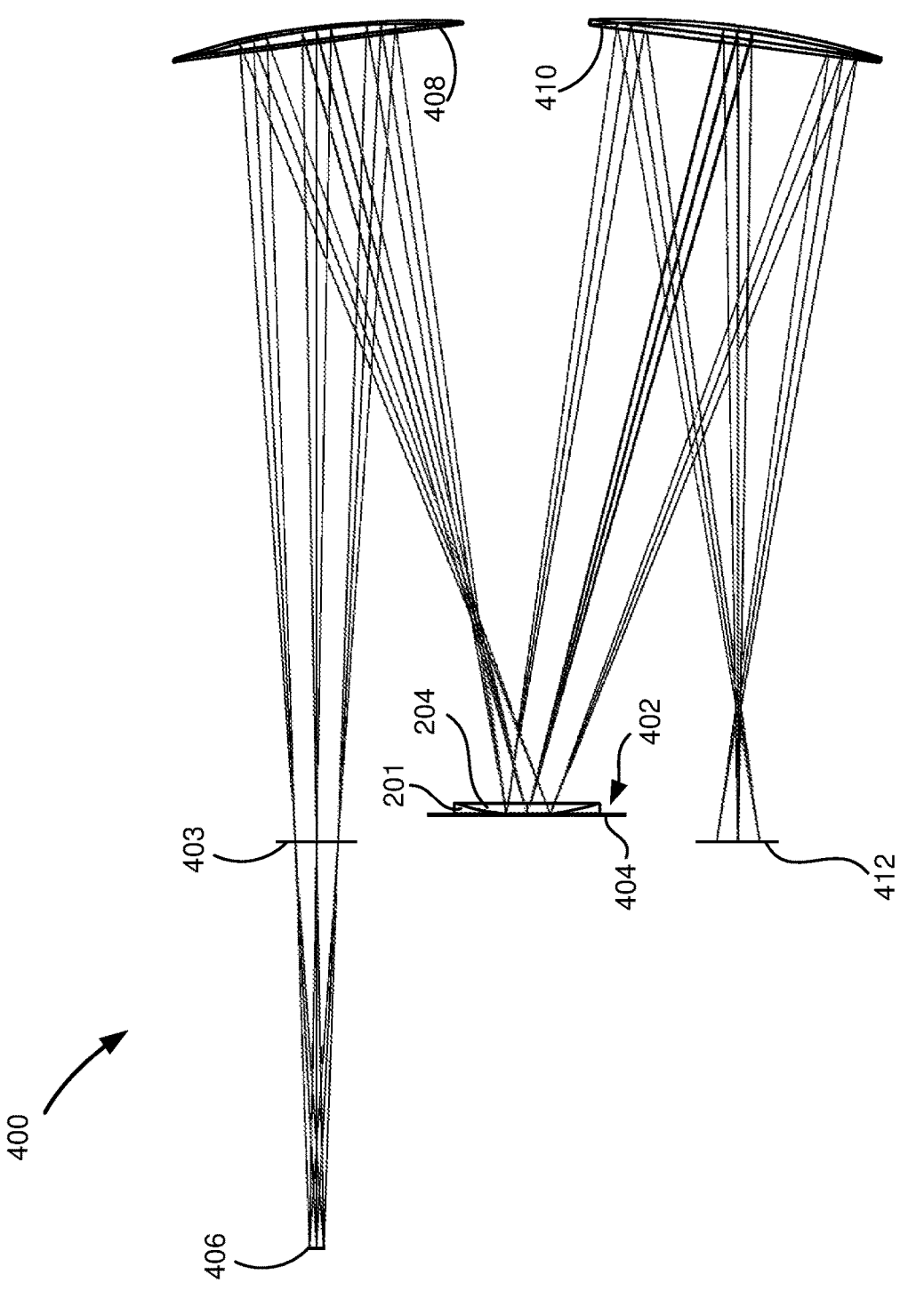
FIG. 4 is a schematic diagram of a spectrophotometer according to a further embodiment of the invention.

FIG. 4 illustrates a spectrophotometer 400 according to a further embodiment of the invention. In the spectrophotometer 400, the sample holder 402 includes a plano-convex lens 204 providing the curved first surface on an underside thereof, and a mirrored sample slide 404 providing a substantially flat second surface on a topside thereof. The sample holder 402 is adapted to hold a measurement sample 201 between the first and second surfaces. In the spectrophotometer 400, light beams from the light source 406 are redirected onto the sample holder 402 and sample 201 via focusing mirror 408. The mirrored sample slide 404 reflects light back through the sample 201 and plano-convex lens 204 onto imaging mirror 410, which focuses the reflected light onto a detector 412 positioned on the same side of the sample 201 as the light source 406. The effective pathlength detected in the embodiment illustrated in FIG. 4 would be approximately doubled as light passes through the measured sample 201 twice. Optionally, a mask 403 can be provided for creating a shadow pattern on the detector 412 to facilitate calculations for a refractive index as discussed in further detail below.

Methods of the calculating the attenuation coefficient of an analyte in a measurement sample 201 using sample holders and spectrophotometers according to embodiments of the present invention will now be discussed below with reference to FIGS. 5 to 11B. Typically, the methods discussed below are computer implemented methods automatically executed on a computer processor, either provided with or separately to the spectrophotometer. The computer processor may include a software application installed thereon for executing one or more of the steps of the computer implemented methods. In alternative embodiments, the software application may be a cloud-based application accessible via a network such as the internet. In some embodiments, the software application may be accessible remotely via a local network.

Each pixel measurement from a 1D or 2D array detector (or from a single point detector) measures the light intensity via an optical path. Generally, each pixel measurement corresponds to a pathlength of the sample holder 100. In practice, the optical path includes transmission and or reflection losses from optical components, transmission losses at interfaces between components, detection losses due to the quantum efficiency of the detector, and absorbance within the measurement sample 201.

Whilst the following calculation methods refer to pixel measurements from an array detector, it is to be understood that an alternative configuration with a movable light source as shown in FIG. 3 can use an equivalent calculation.

Figure 5:
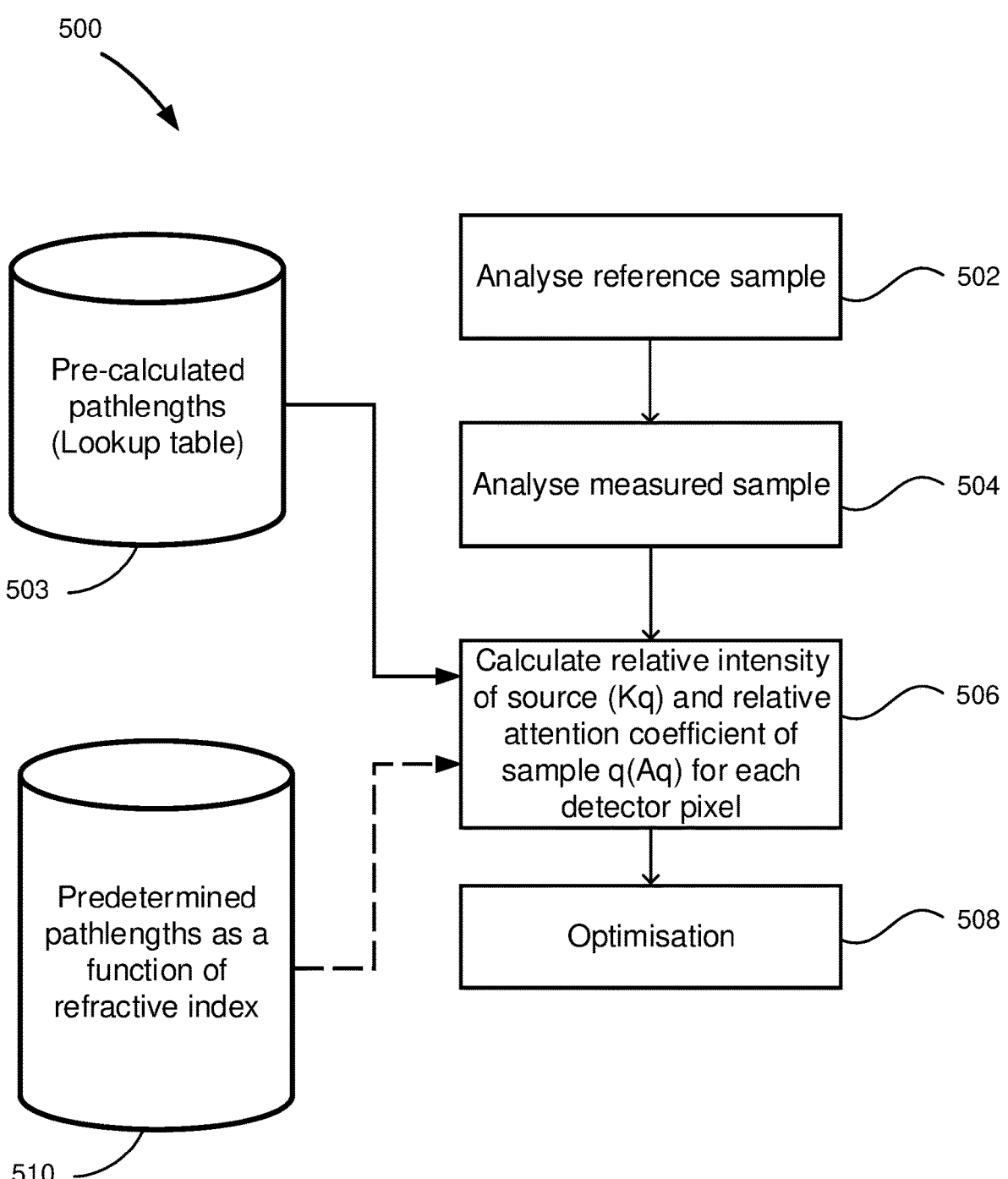
FIG. 5 is a flow diagram illustrating a method of analysing a sample using a spectrophotometer according to an embodiment of the invention.

In the calculation method 500 illustrated in the flow diagram of FIG. 5, it is assumed that there is little change in sample refractive index between different samples, or that the geometry of the sample holder 100 is designed to keep image movement due to refraction negligible. In some embodiments, this can be achieved by providing a sample holder 100 in which the first curved surface 102 has a regular geometry with a relatively large radius of curvature. In these scenarios, the optical pathlength within the sample 201 corresponding to each pixel can be pre-calculated based on the predetermined geometries of the first and second surfaces 102, 104 of the sample holder 100. In one example, the pathlengths can be pre-calculated using a commercially available optical ray tracing software program. In one embodiment, a look-up table 503 of sample pathlengths for each detector pixel could be pre-calculated for a particular sample holder design and stored in the memory of the computer processor. Alternatively, the computer processor may calculate the sample pathlengths in real-time based on the predetermined geometry of the sample holder 100.

Once the optical pathlength is known for each pixel, the following calculation approach can be used regardless of whether the detector array is one-dimensional or two-dimensional, or whether any arbitrary positioning of multiple detectors is used. This calculation approach can also be applied to sample holders having different optical geometries with different distributions of sample pathlengths.

For the example illustrations provided herein in FIGS. 5 to 11B, the sample pathlengths are for a sample holder having a parabolic cylinder for the first surface and a substantially flat second surface when used with a 1D array detector, or for a sample holder having a spherical first surface and a substantially flat second surface when used with a 2D array detector.

At step 502 of the method 500, a reference or baseline sample is placed in the sample holder 100. Each pixel of the detector 202 receives light from the light source 208 with some attenuation due to the total optical path and detector sensitivity. The path attenuation remains effectively constant over time, but the source intensity may not. The signal received at each pixel of the detector 202 is referred to herein as the reference signal $S_{ref}$. The reference signal is measured by the detector 202 and recorded by the computer processor. The measured and recorded reference signal $S_{ref}$ for each detector pixel can be expressed using equation (1) as follows:

$$S_{ref}[p] = I_{ref} \times T[p] \tag{1}$$

wherein:

$S_{ref}[p]$ is the reference signal received by detector pixel p, $I_{ref}$ is the source intensity at the time that the reference signal $S_{ref}[p]$ is measured and recorded, T[p] is the transmission of the total optical path (including the reference sample path) from the source 208 to the detector pixel p.

At step 504, a measurement sample q is placed in the sample holder 100. The light reaching each detector pixel is attenuated by the absorbance of the sample q. The signal received at each pixel of the detector 202 is referred to herein as the sample signal $S_q$. The measured and recorded sample signal $S_q$ for each detector pixel can be expressed using equation (2) as follows:

$$S_q[p] = I_q \times T[p] \times 10^{(-A_q \times L[p])} \tag{2}$$

wherein:

$S_q[p]$ is the sample signal received by detector pixel p for sample q, $I_q$ is the source intensity at the time that the sample signal for sample q is measured and recorded, T[p] is the transmission of the total optical path $A_q$ is the difference between the decadic attenuation coefficient of sample q and that of the reference sample L[p] is the pre-calculated sample pathlength for pixel p (e.g. provided by the lookup table in database 503).

At step 506, a ratio of equations (1) and (2) cancels out variable T[p] (the transmission of the total optical path) and equation (3) below can be derived as follows.

$$S_q[p]/S_{ref}[p] = \left(I_q/I_{ref}\right) \times 10^{(-A_q \times L[p])} \tag{3}$$

Or $$T_q[p] = K_q \times 10^{(-A_q \times L[p])}$$

where:

$T_q[p]$ represents the sample transmission of detector pixel p for sample q with no correction for source changes, (i.e. the single beam sample transmission of pixel p).

$K_q$ is the source intensity ratio for sample q relative to the reference measurement.

As the signal detected at each pixel p provides a new set of values for equation (3), the relative intensity of the source ($K_q$) and the relative attenuation coefficient of the sample ($A_q$) can be calculated at step 506 based the detected signals and the pre-calculated pathlengths 503.

Figure 6A:
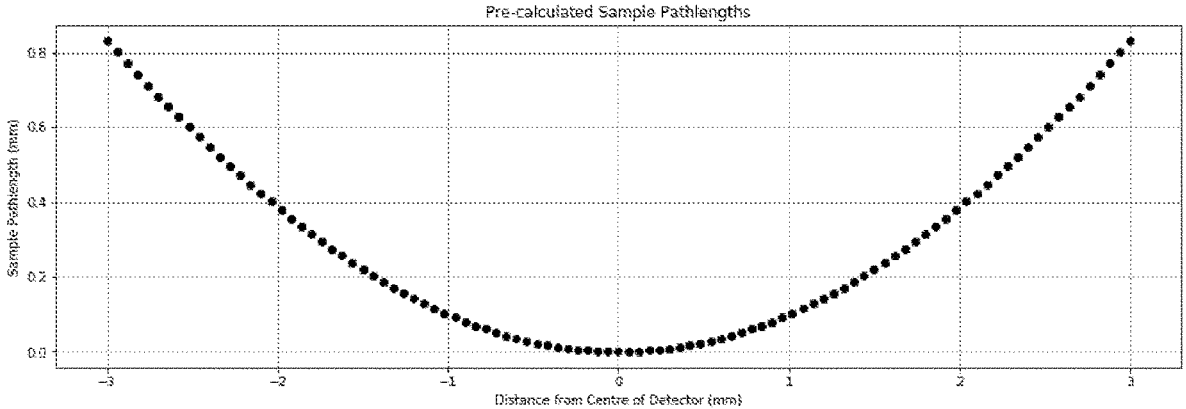
FIG. 6A is an X-Y plot illustrating pre-calculated sample pathlengths between the first surface and the second surface of the sample holder shown in FIG. 1A.
Figure 6B:
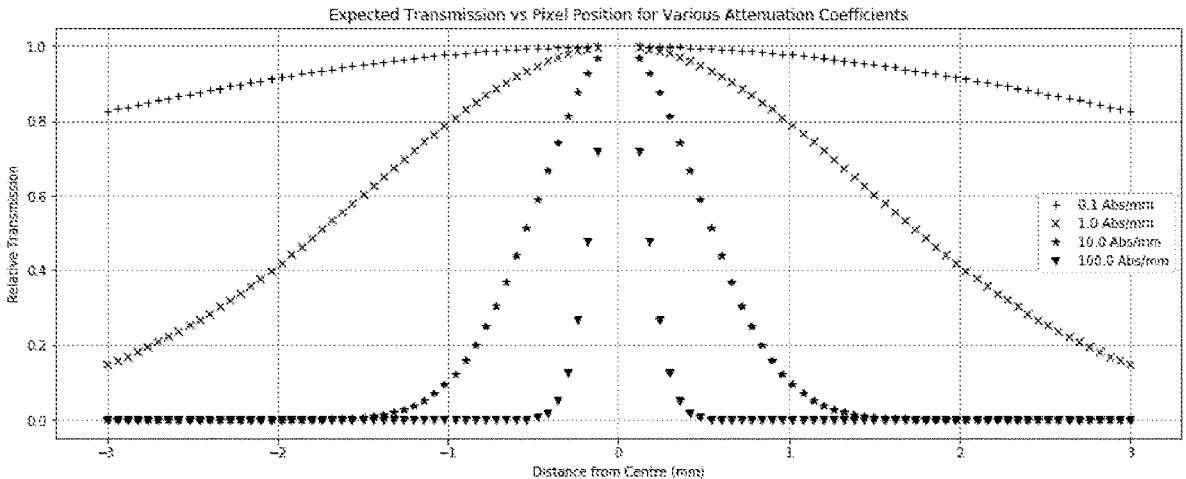
FIG. 6B: is an X-Y plot illustrating relative sample transmissions using the sample holder of FIG. 1A for samples having difference absorbances. The relative sample transmissions are plotted against a plurality of pixel positions across a one-dimensional array detector.

For example, the graph in FIG. 6A illustrates the range of sample pathlengths corresponding to the pixels of a linear array detector. The graph in FIG. 6B illustrates the expected relative sample transmissions for each pixel of a linear array detector for a number of different samples with different absorbances. Anomalous transmissions are expected for any detector pixel corresponding to a sample pathlength of zero or near zero (i.e. in the first measurement zone 108 of the sample holder where the two optical surfaces are in contact). For these optical paths, the Fresnel losses from optical surface to sample disappear and create a discontinuity in the expected transmission. Accordingly, detector pixels corresponding to a sample pathlength of zero or near zero can be omitted from the measurement.

Figure 7A:
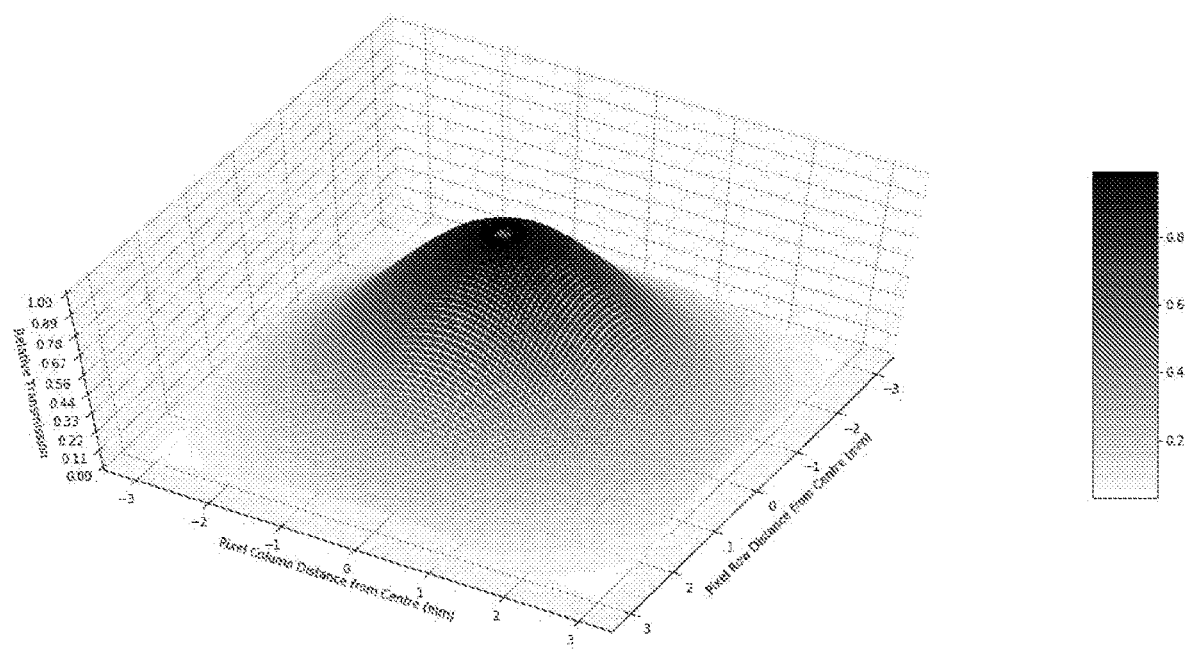
FIG. 7A is an XYZ plot illustrating relative sample transmissions using the sample holder of FIG. 1A. The relative sample transmissions are plotted against a plurality of pixel positions across a two-dimensional array detector.
Figure 7B:
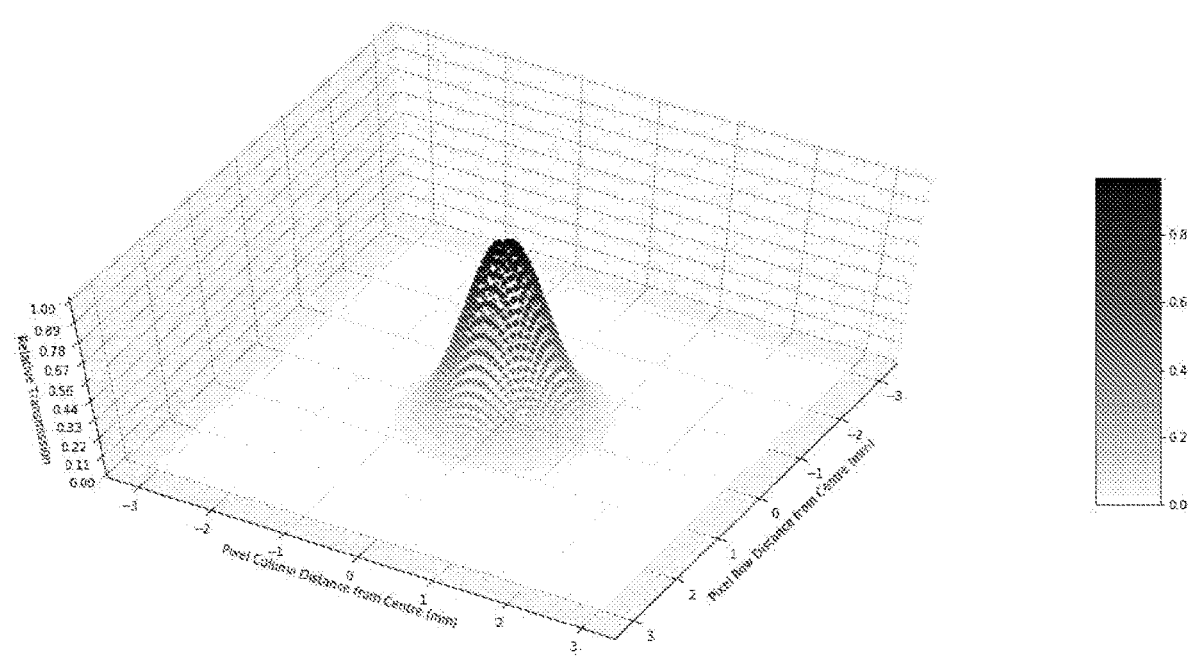
FIG. 7B is an XYZ illustrating relative sample transmissions using the sample holder of FIG. 1A. The sample corresponding to FIG. 7B has a higher absorbance compared with that of FIG. 7A. The relative sample transmissions are plotted against a plurality of pixel positions across a two-dimensional array detector.

The graphs in FIGS. 7A and 7B illustrate the relative sample transmissions for a 2D array detector where the sample holder 100 comprises a spherical first surface 102 and a flat second surface 104. The sample absorbance corresponding to transmission values in FIG. 7B is higher than that of FIG. 7A.

In one embodiment, the processor converts the 2D data points shown in FIGS. 7A and 7B to a plurality of 1D arrays of transmissions vs pathlengths (e.g. as shown in FIG. 6B) before applying equations (1) to (3) above to carry out the calculation method 500.

At step 508, the processor calculates estimated transmission values using initial guessed or approximated values for relative intensity of the source (Kq) and the relative attenuation coefficient of the sample ($A_q$) in equation (3) and uses an optimisation algorithm to refine these values to determine a final value for the attenuation coefficient of the sample ($A_q$) that minimises an error between the estimates transmission values and the corresponding detected transmission values for each pixel. In one embodiment, an iterative optimisation process based on the following FitError function (4) can be used:

$$\text{Minimize } FitError(A_q, K_q) \text{ subject to } A_q \geq 0; K_q \geq 0 \tag{4}$$

The FitError function calculates a predicted set of transmission values and produces a value representing how far those transmission values differ from the measured transmission values. One option to minimise the error is by minimizing the sum of the squared differences, for example as follows:

$$T_{est}[p] = K_q \times 10^{(-A_q \times L[p])}$$

$$FitError = \text{Sum}\left((T_q[p] - T_{est}[p])^2\right)$$

Figure 8:
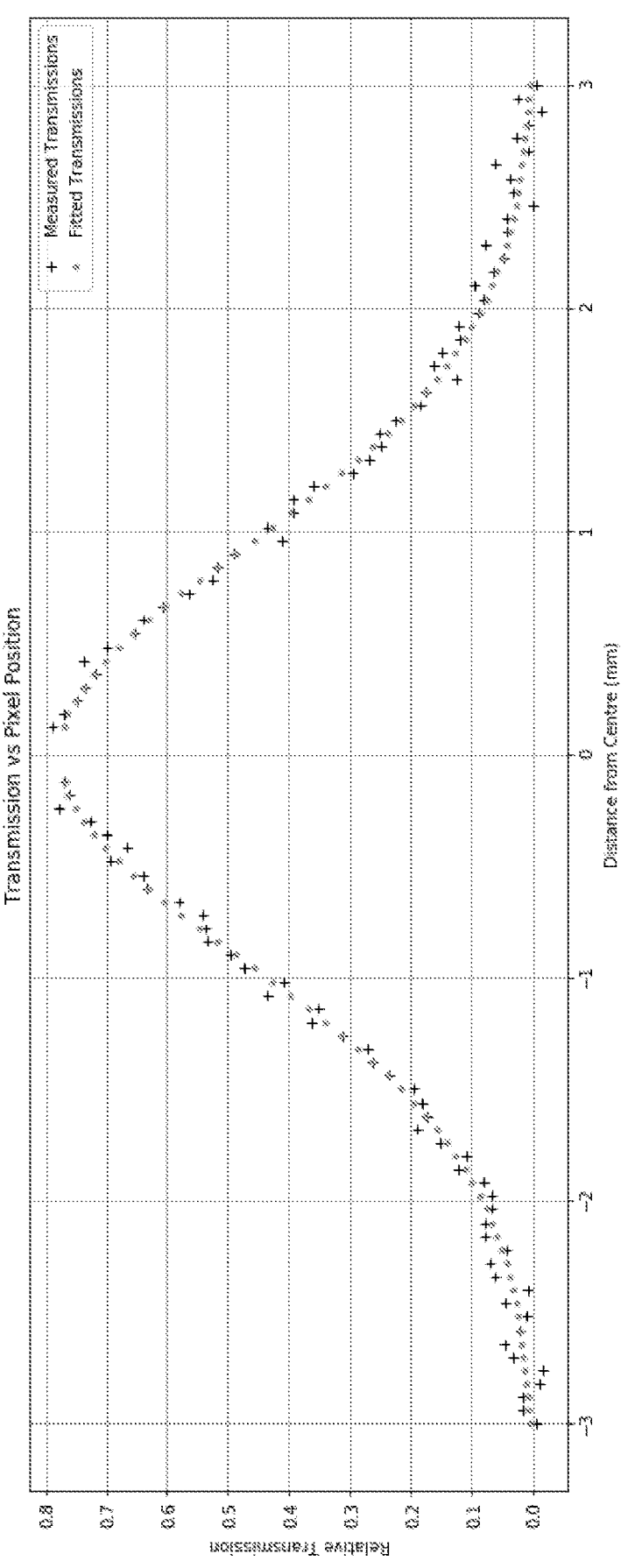
FIG. 8 is an X-Y plot illustrating measured transmission values and the expected transmission values after parameter optimization of the attenuation coefficient and relative source intensity.

The graph in FIG. 8 is a plot of measured transmissions marked by data points '+' and the fitted transmissions marked by data points '•' after applying the optimisation algorithm in step 508. The iterative optimisation process discussed herein is not limited to regular symmetric optical surfaces, thereby advantageously avoids overly constraining the optical design whilst providing system flexibility.

In some scenarios, the distortion of the signal received at the detector 202 due to effects of the refractive index cannot be ignored. Typically, in these scenarios, the pathlength corresponding to each detector pixel changes due to refraction.

When the geometry of the first surface 102 of the sample holder 100 is a parabolic cylinder or sphere and the second surface 104 is substantially flat, a change of refractive index will produce similar transmission patterns changes as a change in the sample's attenuation coefficient. This ambiguity in the measurements can be resolved in a number of different ways, for example:

(a) By using uniform source illumination and choosing the geometries of the first and second surfaces 102, 104 of the sample holder 100 such that the patterns of transmissions change in easily distinguishable ways when either refractive index or attenuation coefficient change.

(b) Including a higher spatial frequency modulation pattern in source illumination (e.g. using a patterned filter 210 in the optical path that focusses a shadow pattern on the detector 202 as shown in FIG. 2) so that changes in sample attenuation coefficient produce absorption-based changes in the transmission pattern, but changes in the refractive index distort the positions of the spatial modulations.

In one embodiment, solution (a) uses a geometry for the first surface 102 of the sample holder 100 that has different surface slopes in two different dimensions, e.g. a paraboloid surface in which:

$$z = a \times x^2 + b \times y^2$$

where $a \neq b$

In this embodiment, an optical ray tracing program is used to calculate the sample pathlengths corresponding to each detector pixel. In this case, the pathlengths are dependent on the refractive index of the sample. By using multiple ray tracings with different assumed refractive indices, a model of the pathlength as a function of refractive index can be created for each detector pixel. A lookup table of pathlengths as a function of refractive index or a set of predetermined functions defining the relationship between pathlengths and refractive indices for the specific sample holder surface geometries can be stored in memory 510 (see FIG. 5).

For solution (a) above, each pathlength is a function of sample refractive index n and a function of detector pixel, i.e. L[p, n]. The general steps of method 500 as described above with reference to FIG. 5 can be followed. However, the method 500 takes into consideration of the refractive index as an extra parameter to be optimized. At each iteration of the optimization, the estimated transmission can be determined based on equation (5) below:

$$T_{est}[p] = K_q \times 10^{(-A_q \times L[p,n])} \qquad (5)$$

In case (b) above, high spatial frequency features are deliberately introduced in the source illumination, for example as shown in FIG. 2. The distortions in the detector signal based on changes in refractive index will affect the positions of the high spatial frequency features detected by the detector 202. To resolve the combined effects of absorbance and refractive index, two example methods are described below with reference to FIGS. 9 to 11B.

Figure 9:
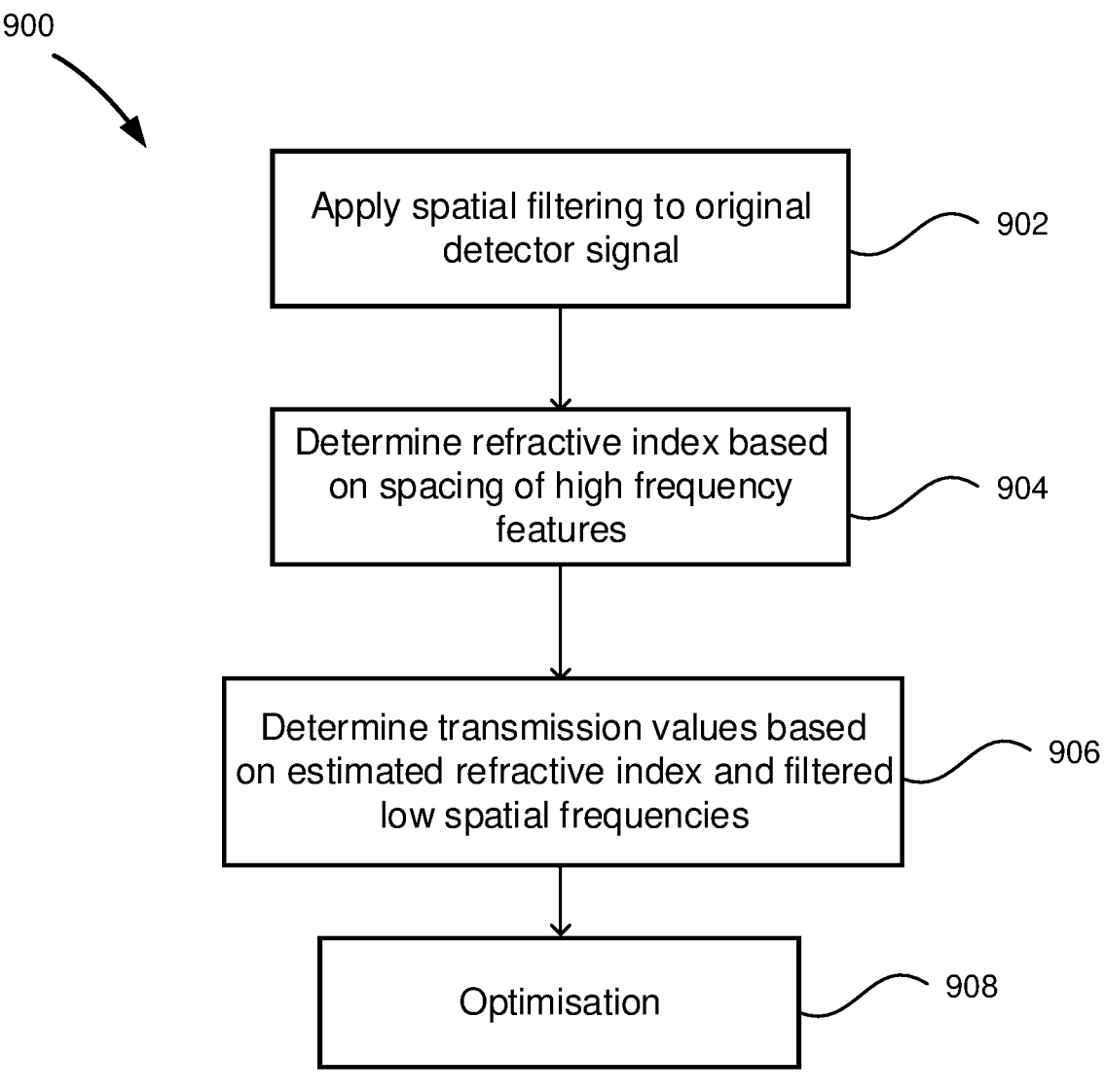
FIG. 9 is a flow diagram illustrating a method of analysing a sample using a spectrophotometer according to an embodiment of the invention.

FIG. 9 is a flow chart illustrating a method 900 of determining the attenuation coefficient of a measurement sample 201 using spatial filtering. According to method 900, the source illumination provides a rapidly changing spatial pattern that can be resolved by the pixels of the detector 202. In particular, any changes in refractive index will stretch or distort that detector signal pattern. The amount of stretching of the pattern in various parts of the detector depends on the optical geometry of the surfaces 102, 104 of the sample holder 100 but is independent of the attenuation coefficient of the sample 201.

By providing smooth changes in the sample pathlength, the low spatial frequency pattern of illumination on the detector 202 allows estimation of the sample's attenuation coefficient. As discussed, the distortion due to refractive index differences introduces errors in that estimation. The independent estimation of refractive index according to method 900 allows for correction of those errors.

Figure 10A:
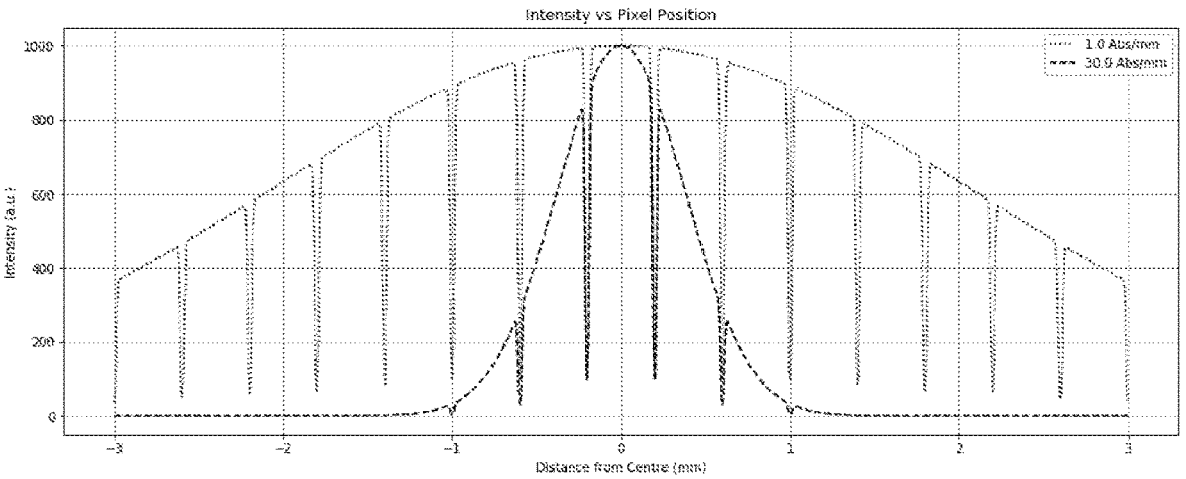
FIG. 10A is a line graph illustrating intensity variation on an array detector when the source illumination is modulated by a mask that creates regularly spaced thin shadows according to the spectrophotometer configuration shown in FIG. 2.
Figure 10B:
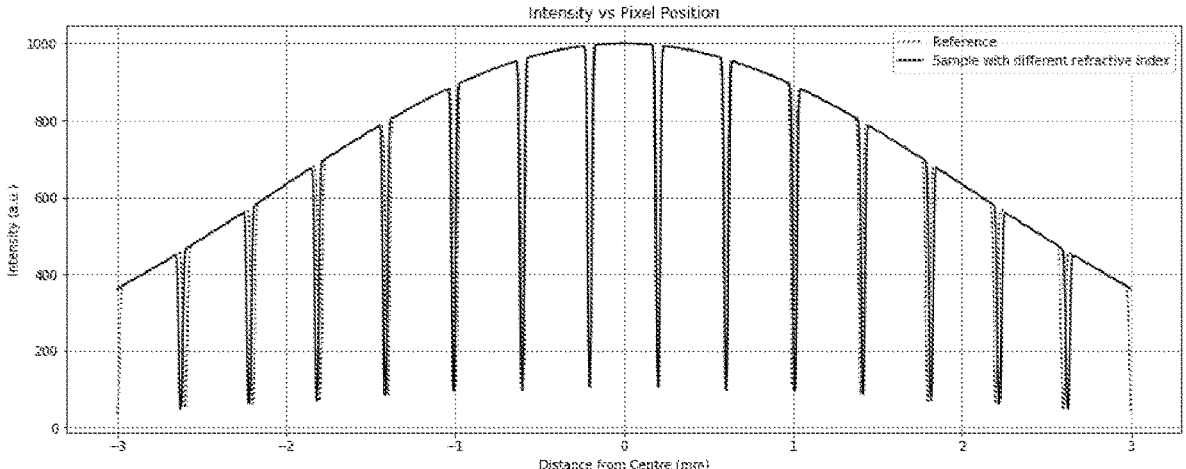
FIG. 10B is a line graph illustrating expected displacement of high spatial frequency features on an array detector due to changes in refractive index.

At step 902, spatial filtering is applied to the original detector signal separate the high spatial frequency features from the low spatial frequency features. FIG. 10A illustrates the original detector signal including high spatial frequency features received from an array detector 202 when the source illumination is spatially modulated by an optical mask 210 that creates regularly spaced thin shadows at the detector 202. As illustrated in FIG. 10A, when the sample absorbance changes and the refractive index remains constant, the high spatial frequency features are aligned in the detector signals. FIG. 10B illustrates lateral displacement of the high spatial frequency features when the sample absorbance remains constant and the refractive index changes.

At step 904, the refractive index of a sample 201 can be estimated based on the extracted the high spatial frequency components of the detector signal. In one embodiment, spacing between the high spatial frequency features can be estimated using peak finding techniques. In one embodiment, multiple ray tracings with different refractive indices is used to create a model or look-up table, which is used to determine a relationship between feature spacing and the corresponding refractive index. In these embodiments, the refractive index n that best predicts the observed feature spacing can be determined.

Figure 11A:
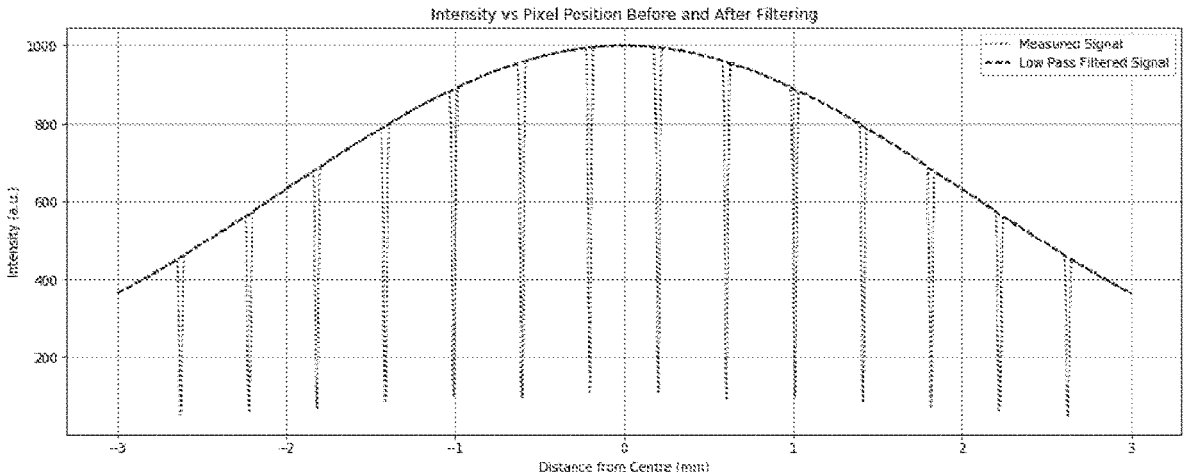
FIGS. 11A and 11B are line graphs illustrating output from low pass filtering to remove the high spatial frequency features from the original detector signal.
Figure 11B:
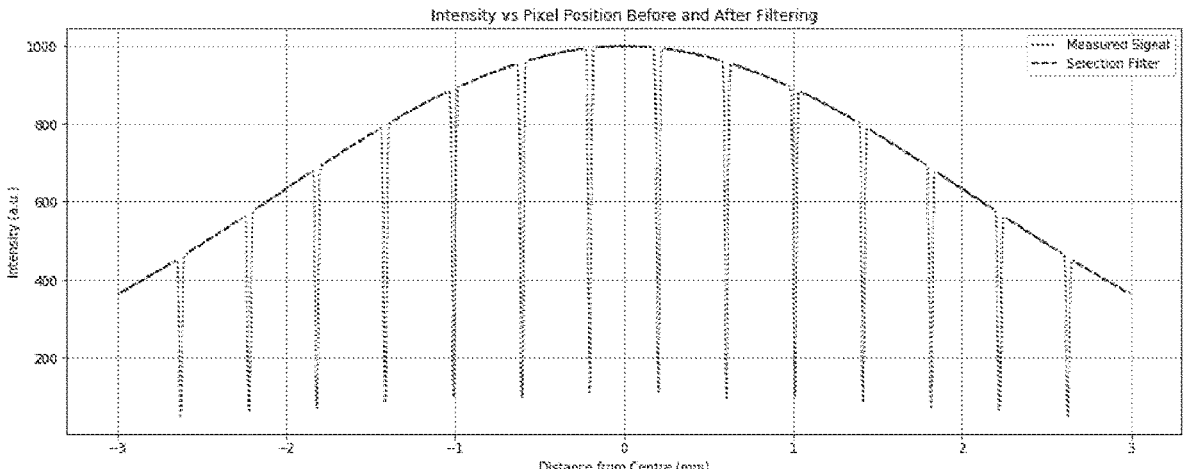

At step 902, the detector signal is also filtered to extract the low spatial frequencies to provide a set of transmission values per detector pixel that attenuates or avoids the high frequency illumination features:

$$T_q = LPF(S_q)/LPF(S_{ref})$$

where:
LPF is a low pass spatial filter (with dimensionality chosen to match the detector: 1D or 2D)
$S_{ref}$ is the array of pixel signals received from the reference sample
$S_q$ is the array of pixel signals received from the sample q
$T_q$ is the array of pixel transmissions $T_q[p]$ for all pixels p FIG. 11A illustrates the output of a combination of median filtering and Savitzky-Golay filtering to remove the high spatial frequency features. FIG. 11B illustrates the output of a filter that excludes any pixels likely to be affected by the thin shadows for the range of expected sample refractive indices.

At step 906, the refractive index n previously estimated in step 904 can then be substituted into L[p,n], allowing parameter optimization to estimate parameters $K_q$ (relative intensity of source) and $A_q$ (relative attenuation coefficient of sample q) in the following equation (6):

$$T_{est}[p] = K_q \times 10^{(-A_q \times L[p,n])} \qquad (6)$$

At step 908, an optimisation algorithm is applied to minimize the fit error in an objective function such as:

$$FitError = Sum((T_q[p] - T_{est}[p])^2)$$

The optimization also provides an estimate of the sample's attenuation coefficient $A_q$ corrected for the distortions from the sample's refractive index.

According to another example method, a modulation model can be created to determine how each detector pixel's relative intensity changes as a function of refractive index. The modulation model may include a look-up table that provides an expected relative signal distribution over the detector's pixels for any possible combination of sample attenuation coefficient and refractive index. Typically, if the expected relative illumination pattern for any sample attenuation coefficient and refractive index can be predicted, then after measuring the relative illumination pattern produced by a sample, the attenuation coefficient and refractive index that would predict a pattern which matches what has been observed can be determined.

The modulation module can be used to optimise the parameters (including refractive index n) to get estimated transmissions to match the observed transmissions in accordance with equation (7) below:

$$T_{est}[p] = K_q \times M[p, n] \times 10^{(-A_q \times L[p,n])} \qquad (7)$$

where M[p, n] is a modulation model that determines how the source spatial modulation appears on the detector at each pixel p for a given refractive index n. Similar to the methods described above, optimization of parameters n, $K_q$ and $A_q$ can be used to minimize the fit error in an objective function such as $$FitError = Sum((T_q[p] - T_{est}[p])^2)$$

Interpretation

This specification, including the claims, is intended to be interpreted as follows:

Embodiments or examples described in the specification are intended to be illustrative of the invention, without limiting the scope thereof. The invention is capable of being practised with various modifications and additions as will readily occur to those skilled in the art. Accordingly, it is to be understood that the scope of the invention is not to be limited to the exact construction and operation described or illustrated, but only by the following claims.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

In the specification, including the claims, the term "comprise", and variants of that term such as "comprises" or "comprising", are used to mean "including but not limited to", unless expressly specified otherwise, or unless in the context or usage an exclusive interpretation of the term is required.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

The claims defining the invention are as follows:

1. A sample holder for use in molecular absorption spectroscopy, the sample holder comprising:

a first surface having a first predetermined geometry defined by a smooth aspheric surface, and a second surface having a second predetermined geometry, the first surface being opposite the second surface, the sample holder being configured to hold a measurement sample between the first surface and the second surface such that a distance between the first surface and the second surface defines an optical pathlength of the sample holder, wherein the predetermined geometries of the first surface and the second surface provide a continuously variable cross-section across the sample holder so as to provide a continuous range of optical pathlengths.

2. A sample holder of claim 1, wherein the continuously variable cross-section includes:

a first measurement zone in which a minimum distance between the first surface and the second surface defines a minimum optical pathlength, and a second measurement zone in which a maximum distance between the first surface and the second surface defines a maximum optical pathlength, and wherein the continuously variable cross-section provides a continuous range of optical pathlengths between the first measurement zone and the second measurement zone.

3. A sample holder of claim 2, wherein in the first measurement zone the first surface contacts the second surface to provide a minimum optical pathlength of zero.

4. A sample holder according to claim 1, wherein the continuous range of optical pathlengths provides pathlength variations in the order of about 1 μm to 3 mm.

5. A sample holder of claim 1, wherein the second surface is substantially flat.

6. A sample holder according to claim 1, wherein the sample holder includes:

a plano-convex lens having a curved side providing the first surface, the plano-convex lens being moveable between an open position in which the first surface is separated from the second surface, and a closed position in which the first surface contacts the second surface and is disposed opposite the second surface.

7. A sample holder according to claim 1, wherein the position of the first surface is fixed relative to the second surface.

8. A sample holder according to claim 1, wherein the sample holder is made of one or more plastic materials.

9. A sample holder according to claim 1, wherein the sample holder is made of one or more glass materials.

10. A spectrophotometer having a sample holder according to claim 1.

11. A spectrophotometer according to claim 10, further including a detector for detecting absorbance of the measurement sample at each pathlength of the continuous range of optical pathlengths, wherein the detector is any one of the following detectors:

a single point detector, a one-dimensional array detector, or a two-dimensional array detector.

12. A spectrophotometer according to claim 10, further including a light source, the light source including any one of the following:

a broadband light source, an LED, and a laser.

13. A spectrophotometer of claim 12, wherein the light source provides light simultaneously across the entire measurement sample.

14. A spectrophotometer of claim 12, wherein the light source provides a light beam, the light beam being moveable relative to the measurement sample to scan the measurement sample such that a transmission value is detectable for each pathlength in the range of pathlengths sequentially.

15. A spectrophotometer of claim 12, further including a mask positioned between the light source and the sample holder such that light passing through the mask projects a predetermined shadow pattern for detection by the detector, the spectrophotometer being configured to calibrate effects caused by refraction at one or both of the first and second surfaces of the sample holder based on the detected shadow pattern.

16. A spectrophotometer according to claim 10, further including a temperature controller for controlling the temperature of the measurement sample.

17. A computer implemented method of using a spectrophotometer to analyse a measurement sample disposed in a sample holder including:

a first surface having a first predetermined geometry, and a second surface having a second predetermined geometry, the first surface being opposite the second surface, the sample holder being configured to hold a measurement sample between the first surface and the second surface such that a distance between the first surface and the second surface defines an optical pathlength of the sample holder, wherein the predetermined geometries of the first surface and the second surface provide a continuously variable cross-section across the sample holder so as to provide a continuous range of optical pathlengths, the spectrophotometer having a light source for emitting light through the measurement sample, and a detector for detecting light intensity transmitted through the measurement sample, the method comprising:

measuring, by the detector, one or more light intensities, obtaining a detected transmission value corresponding to each optical pathlength of the sample holder, the detected transmission value being based on the one or more light intensity measurements from the detector, calculating an estimated transmission value corresponding to each optical pathlength of the sample holder, and determining an attenuation coefficient of the measurement sample that minimizes an error between the detected transmission values and the estimated transmission values.

18. A method of manufacturing a sample holder including:

a first surface having a first predetermined geometry defined by a smooth aspheric surface, and a second surface having a second predetermined geometry, the first surface being opposite the second surface, the sample holder being configured to hold a measurement sample between the first surface and the second surface such that a distance between the first surface and the second surface defines an optical pathlength of the sample holder, wherein the predetermined geometries of the first surface and the second surface provide a continuously variable cross-section across the sample holder so as to provide a continuous range of optical pathlengths, the method comprising:

forming a first portion of the sample holder to provide the first surface, forming a second portion of the sample holder to provide the second surface, and attaching the first portion to the second portion such that the first portion is movable relative to the second portion between an open position to allow placement or removal of the measured sample, and a closed position in which the first surface is in a fixed position relative to the second surface to provide the continuously variable cross-section across the sample holder.

* * * * *